US011860272B2

(12) United States Patent
Elian et al.

(10) Patent No.: US 11,860,272 B2
(45) Date of Patent: Jan. 2, 2024

(54) ULTRASONIC TOUCH SENSOR

(71) Applicant: Infineon Technologies AG, Neubiberg (DE)

(72) Inventors: Klaus Elian, Alteglofsheim (DE); Christoph Steiner, St. Margarethen a. d. Raab (AT); Horst Theuss, Wenzenbach (DE); Matthias Eberl, Taufkirchen (DE); Fabian Merbeler, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/053,583

(22) Filed: Nov. 8, 2022

(65) Prior Publication Data
US 2023/0152448 A1    May 18, 2023

(30) Foreign Application Priority Data
Nov. 16, 2021    (DE) .......................... 102021129855.5

(51) Int. Cl.
G06F 3/043    (2006.01)
G01S 15/08    (2006.01)

(52) U.S. Cl.
CPC ............. *G01S 15/08* (2013.01); *G06F 3/043* (2013.01)

(58) Field of Classification Search
CPC ..... G06F 3/0436; G06F 3/043; B06B 1/0292; B06B 1/02
See application file for complete search history.

(56) References Cited

U.S. PATENT DOCUMENTS

| | | | | |
|---|---|---|---|---|
| 5,435,313 | A * | 7/1995 | Noda | B06B 1/0629 600/459 |
| 7,547,282 | B2 * | 6/2009 | Lo | A61B 5/02438 600/443 |
| 9,067,779 | B1 * | 6/2015 | Rothberg | B81B 7/007 |
| 9,513,739 | B2 * | 12/2016 | Herz | G09G 3/3406 |
| 9,955,426 | B2 * | 4/2018 | Herz | G06F 1/3203 |
| 10,802,124 | B2 * | 10/2020 | Elian | G10K 11/004 |
| 2004/0167409 | A1 * | 8/2004 | Lo | A61B 5/02438 600/485 |
| 2012/0001960 | A1 * | 1/2012 | Herz | G06F 1/3265 345/102 |
| 2013/0181131 | A1 | 7/2013 | Holenarsipur | |
| 2016/0111561 | A1 | 4/2016 | Hsu et al. | |
| 2017/0108583 | A1 * | 4/2017 | Elian | B81B 7/0061 |
| 2018/0076247 | A1 | 3/2018 | Pang et al. | |
| 2020/0349342 | A1 * | 11/2020 | Ralston | A61B 5/1176 |
| 2020/0353507 | A1 * | 11/2020 | Zhao | G06V 40/1306 |
| 2021/0043584 | A1 * | 2/2021 | Machida | H01L 23/3157 |
| 2023/0063120 | A1 * | 3/2023 | Elian | G06F 3/0436 |

FOREIGN PATENT DOCUMENTS

| | | |
|---|---|---|
| DE | 102005040081 B4 | 6/2012 |
| WO | 2017/003160 A1 | 1/2017 |
| WO | 2017/068372 A1 | 4/2017 |

\* cited by examiner

*Primary Examiner* — Olga V Merkoulova
(74) *Attorney, Agent, or Firm* — Harrity & Harrity, LLP

(57) ABSTRACT

An ultrasonic touch sensor includes: a covering having a contact face configured to receive a touch; a first ultrasonic transducer element; a first semiconductor chip comprising the first ultrasonic transducer element; a second ultrasonic transducer element; and an acoustic barrier formed between the first ultrasonic transducer element and the second ultrasonic transducer element.

20 Claims, 14 Drawing Sheets

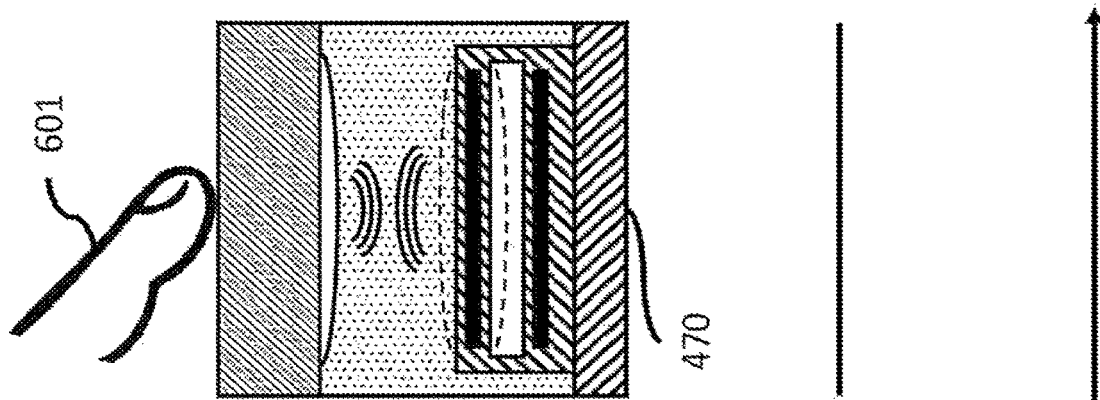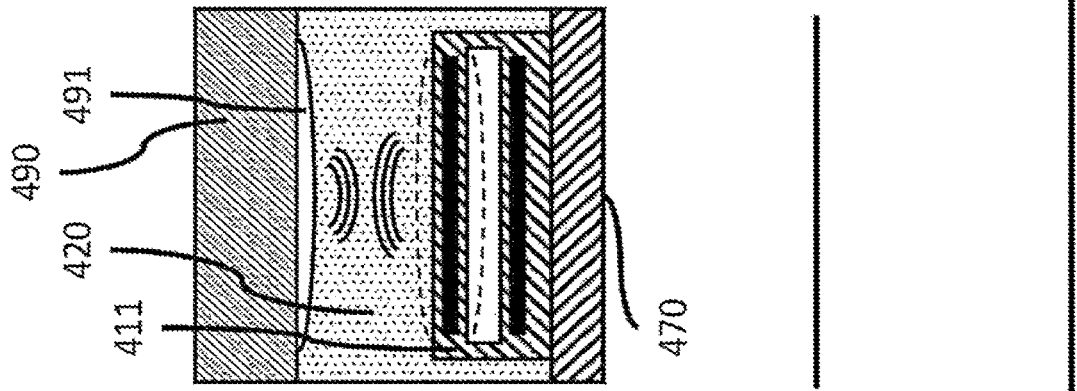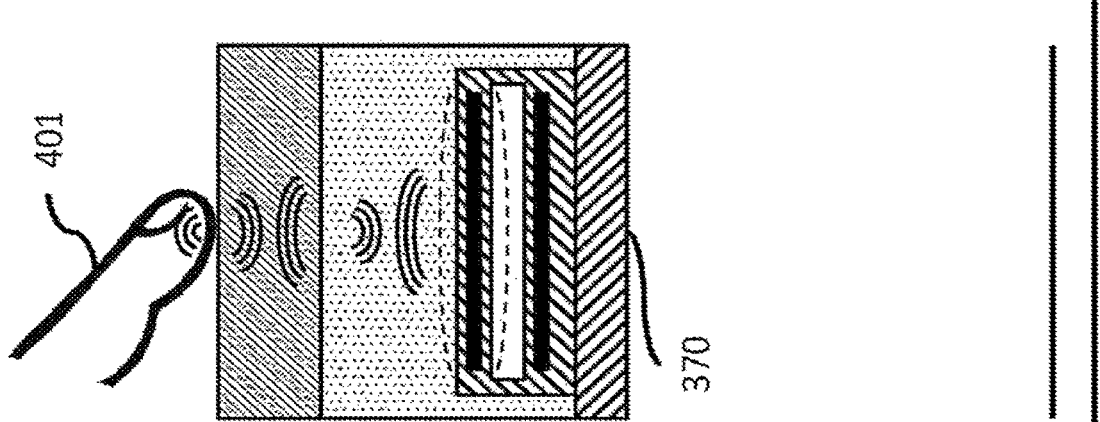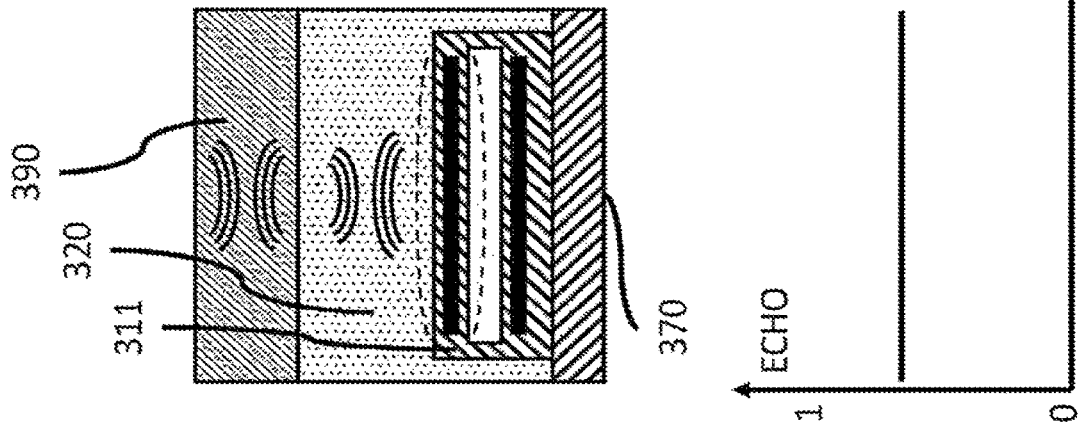

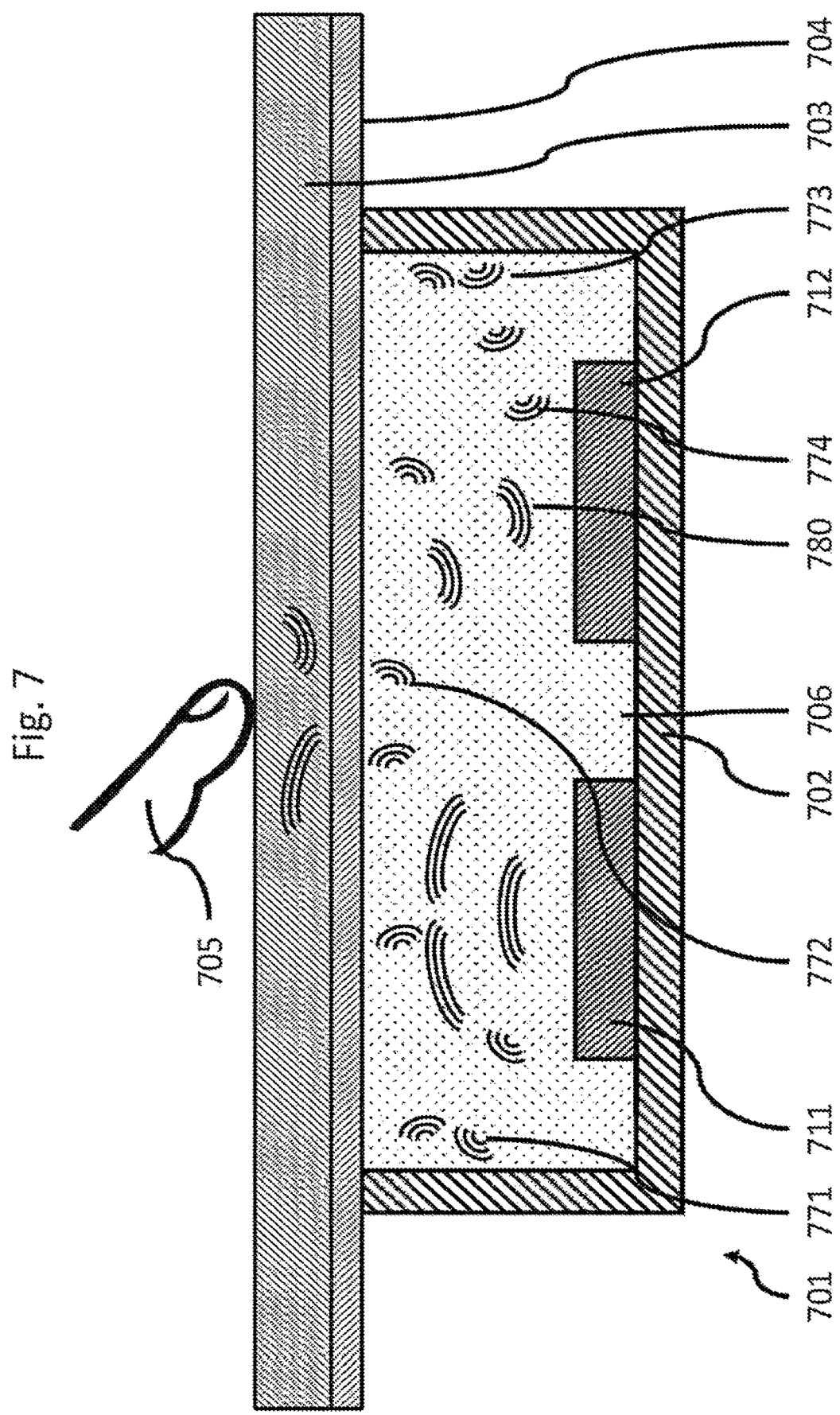

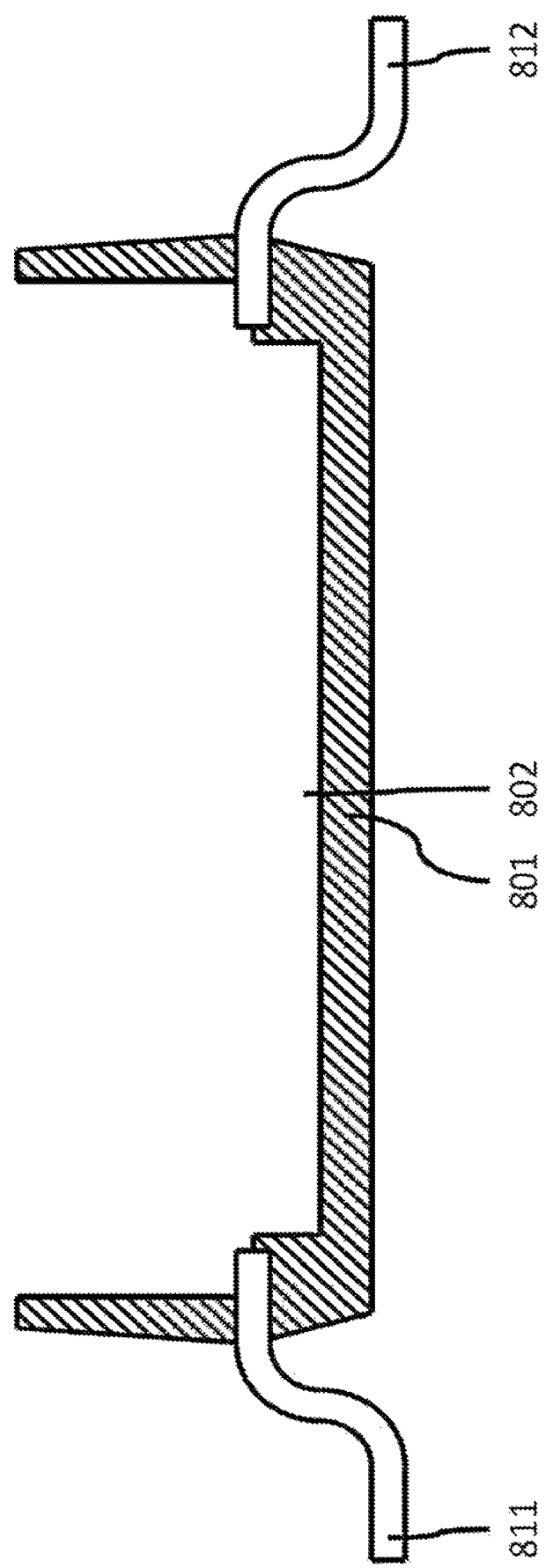

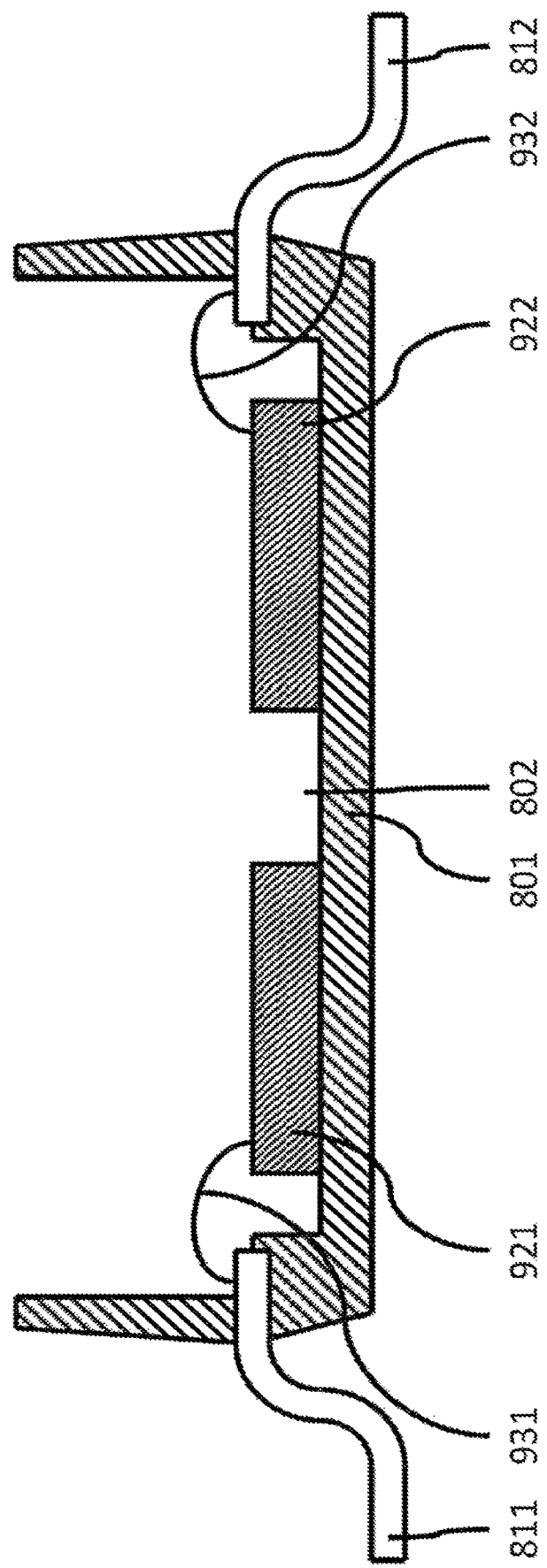

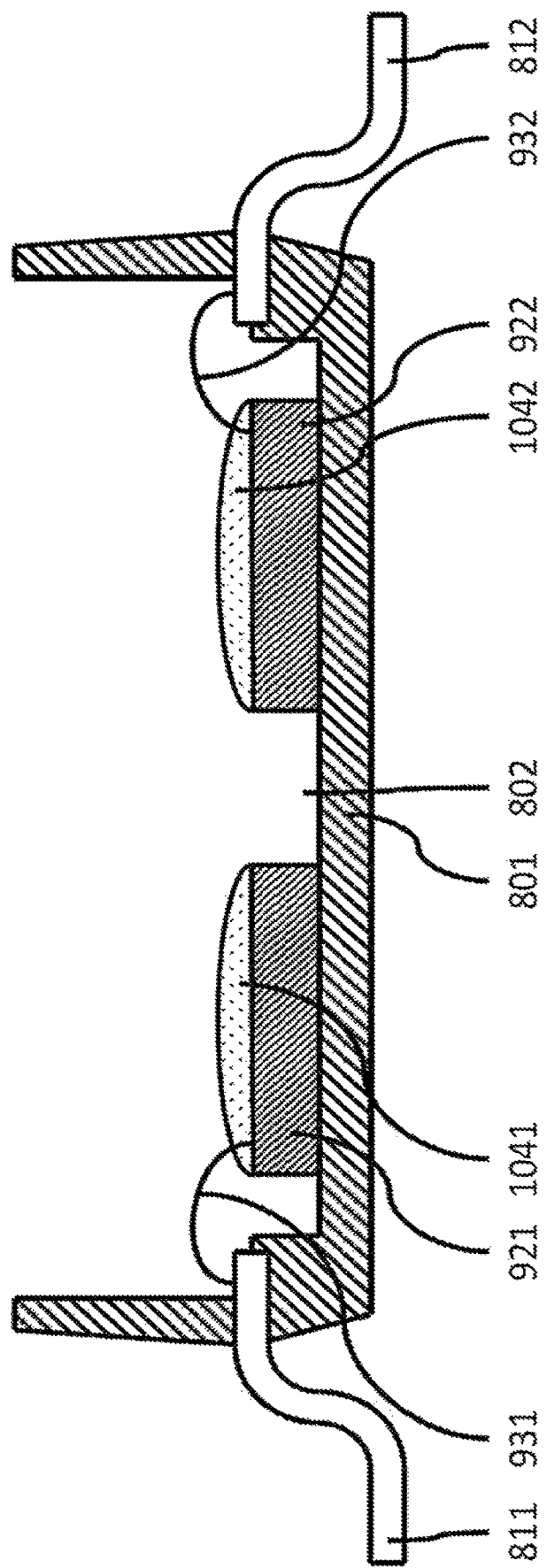

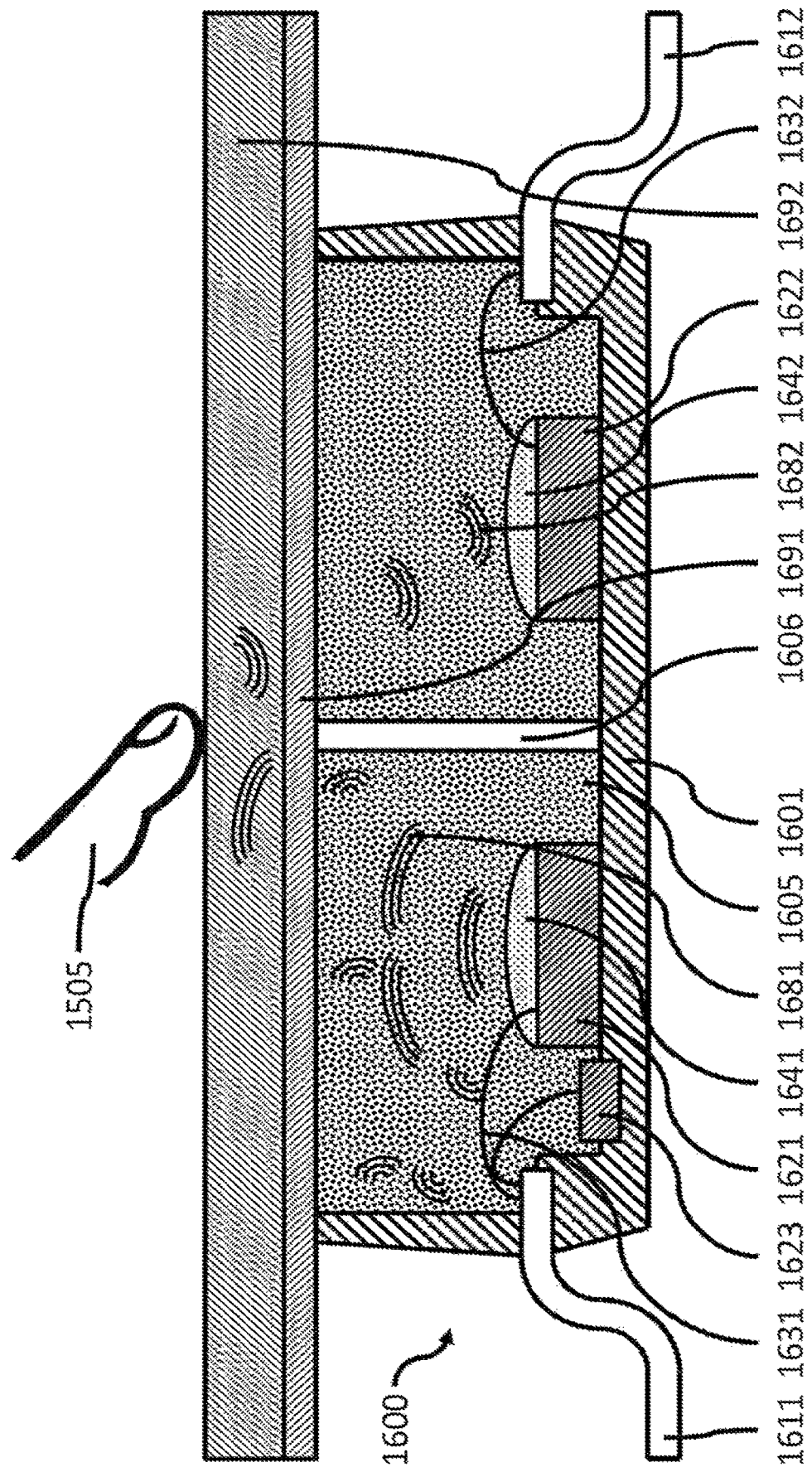

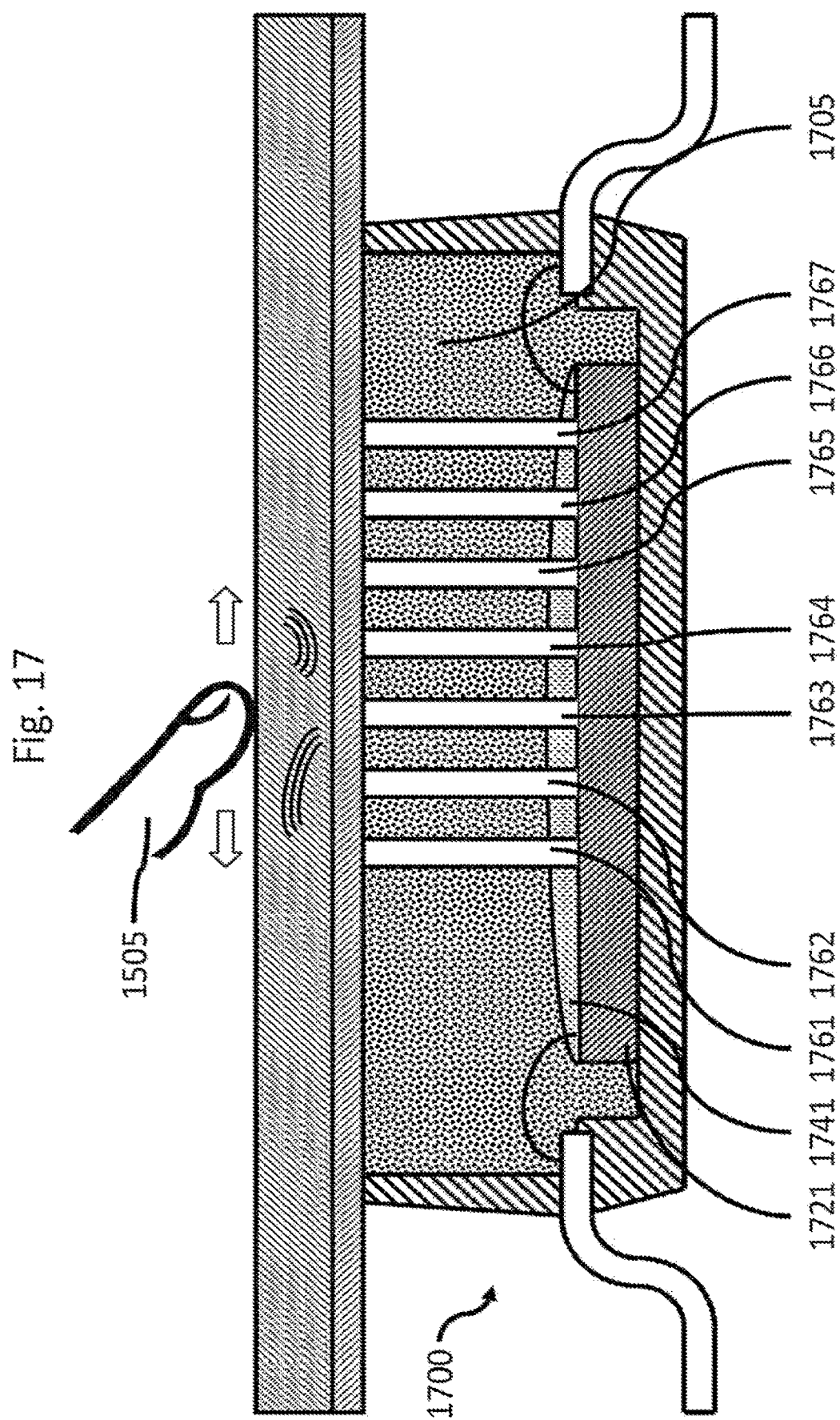

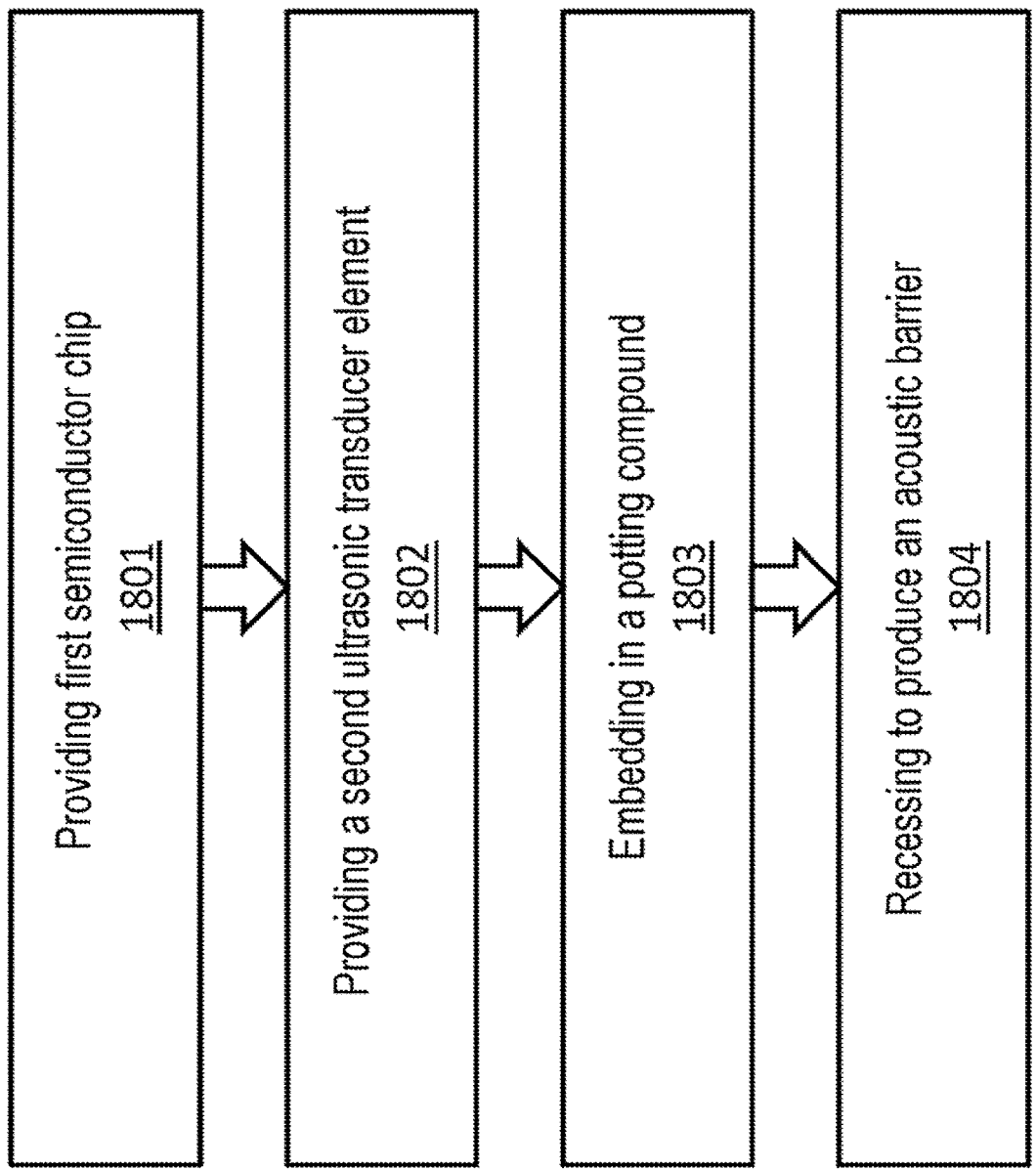

ULTRASONIC TOUCH SENSOR

CROSS REFERENCE TO RELATED APPLICATION

This application claims priority to German Patent Application No. 102021129855.5 filed on Nov. 16, 2021, the content of which is incorporated by reference herein in its entirety.

BACKGROUND

In many fields of application, interaction of a user with an electronic system is required. For example, in a motor vehicle, a switch is used for actuating the windshield ventilation and a corresponding display is used. Often, touch sensors are used as the switch. Capacitive touch sensors are subject to restrictions in terms of the material of the surface on which they are intended to detect touching. For example, a combination of a metallic touch face with a capacitive touch sensor is not generally possible. In ultrasonic touch sensors, the touch face may consist of various materials. However, good acoustic coupling to the touch face is necessary in order to identify touching reliably.

SUMMARY

An object of the present implementation is to provide an ultrasonic touch sensor which allows particularly reliable detection of touching, which can be achieved by the subject-matter of one or more claims, as well as example implementations described in the following description.

An ultrasonic touch sensor is provided, having a contact face for applying the ultrasonic touch sensor onto a covering, having a first ultrasonic transducer element, having a first semiconductor chip, the first semiconductor chip including the first ultrasonic transducer element, and having a second ultrasonic transducer element, wherein an acoustic barrier is formed between the first ultrasonic transducer element and the second ultrasonic transducer element.

A method for producing an ultrasonic touch sensor is likewise disclosed, wherein a first semiconductor chip is provided, wherein the first semiconductor chip including a first ultrasonic transducer element, wherein a second ultrasonic transducer element is provided, wherein the first semiconductor chip is embedded in a potting compound, wherein a recess is introduced into the potting compound, in particular using laser ablation, in order to produce an acoustic barrier between the first ultrasonic transducer element and the second ultrasonic transducer element.

BRIEF DESCRIPTION OF THE DRAWINGS

Examples of one or more ultrasonic touch sensors and of one or more methods will now be explained in more detail with the aid of the drawing. In the drawings:

FIG. 3 shows an ultrasonic transducer element in a first situation;
FIG. 4 shows the ultrasonic transducer element shown in FIG. 3 in a second situation;
FIG. 5 shows an ultrasonic transducer element in a third situation;
FIG. 6 shows the ultrasonic transducer element shown in FIG. 5 in a fourth situation;
FIG. 7 shows an ultrasonic touch sensor;
FIG. 8 shows a step for a production of an ultrasonic touch sensor
FIG. 9 shows a step for the production of an ultrasonic touch sensor;
FIG. 10 shows a step for the production of an ultrasonic touch sensor;
FIG. 16 shows an ultrasonic touch sensor;
FIG. 17 shows an ultrasonic touch sensor;
and
FIG. 18 shows a flowchart for the production of an ultrasonic touch sensor.

DETAILED DESCRIPTION

Figure 2:
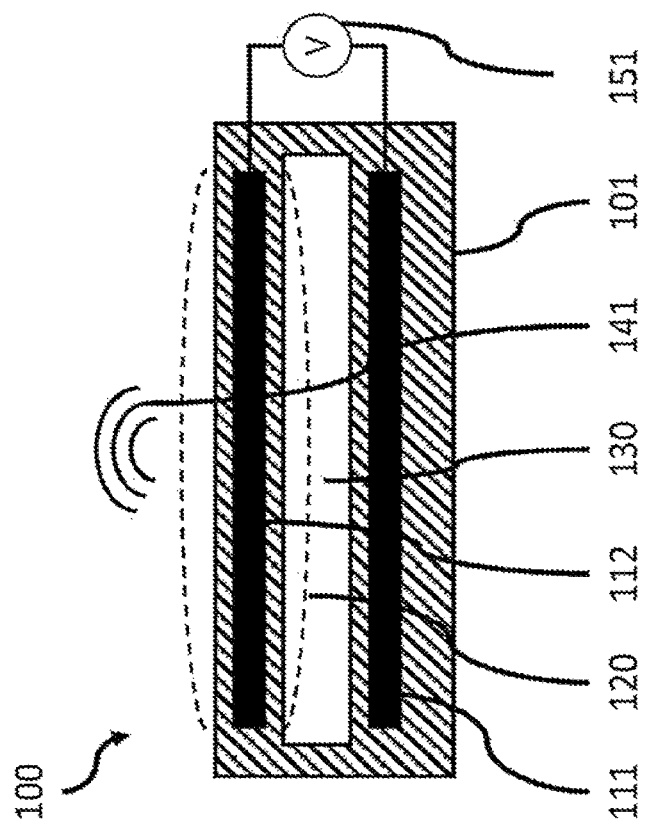
FIG. 2 shows an ultrasonic transducer element.
Figure 1:
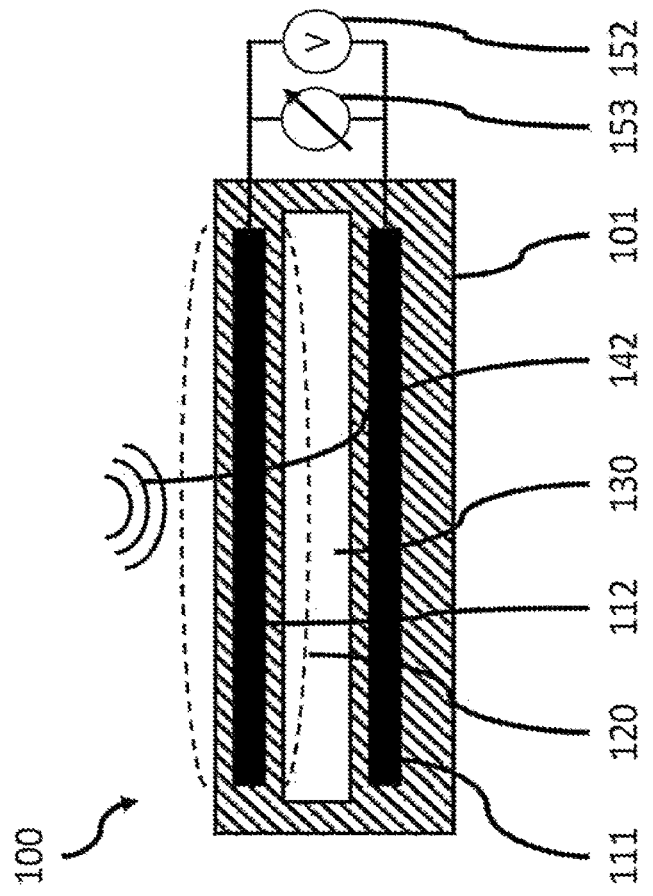
FIG. 1 shows an ultrasonic transducer element.

FIGS. 1 and 2 represent an ultrasonic transducer element 100. The ultrasonic transducer element 100 comprises a diaphragm 120 with an electrode 112, and a substrate 101 with an electrode 111. A cavity 130, which allows movement of the diaphragm 120, is provided between the diaphragm 120 and the substrate 101.

By applying an AC voltage between the electrodes 111 and 112 using a voltage source 151, the diaphragm 120 can be excited in oscillation so that the ultrasonic transducer element 100 can emit ultrasound waves 141.

The ultrasonic transducer element 100 shown in FIGS. 1 and 2 may likewise be used to detect ultrasound waves 142. For this purpose, a DC voltage may be applied between the electrodes 111 and 112 using the voltage source 152. The ultrasound waves 142 can excite the diaphragm 120 in oscillation. An AC voltage is induced because of the distance which therefore varies between the electrodes 111 and 112, and can be measured using a measuring device 153.

FIGS. 3 to 6 schematically represent the way in which touching of a covering 390, 490 (e.g., a cover or lid) on the opposite side of the covering 390, 490 from the ultrasonic touch sensor can be registered using the ultrasonic transducer element 311 or 411, respectively. The ultrasonic transducer element 311 or 411 is respectively embedded in an encapsulation layer 320, 420, the encapsulation layer 320, 420 comprising a contact surface via which the ultrasonic touch sensor is applied on the covering 390, 490. The ultrasonic transducer element 311, 411 may respectively be fastened on a circuit board 370, 470 and electrically connected thereto.

As shown in FIG. 3, ultrasound waves can be generated using the ultrasonic transducer element 311, these being transmitted substantially fully through the interface between the encapsulation layer 320 and the covering 390 and subsequently reflected at the free surface of the covering 390 on the opposite side from the encapsulation layer 320. After transmission back through the interface between the covering 390 and the encapsulation layer 320, the ultrasound waves can again be detected by the sensor element 311 so that an echo signal as represented below FIG. 3 is obtained.

If the free surface of the covering 390 on the opposite side from the encapsulation layer 320 is touched, for example with a finger 401, only a small proportion of the ultrasound waves will be reflected at the free surface and the echo signal will decrease, as represented below FIG. 4.

FIG. 5 shows that a cavity 491 remains when the ultrasonic touch sensor is applied on the covering 490. The effect of this cavity 491 is that the ultrasound waves emitted by the sensor element 411 do not pass through the interface between the encapsulation layer 420 and the covering 490, but are reflected at this interface so that an echo signal as represented underneath is obtained.

Since the ultrasound waves are not (or are almost not) transmitted into the covering, touching the covering 490 with the finger 601 does not lead to a change in the echo signal.

Although a capacitive sensor element 311, 411 has been described above, corresponding considerations also apply for a piezoelectric sensor element, in particular for ultrasonic transceivers which operate according to a piezoelectric measurement principle.

FIG. 7 illustrates an ultrasonic touch sensor 701 that comprises a housing 702 in which a first semiconductor chip 711 and a second semiconductor chip 712 are arranged. The first semiconductor chip 711 and the second semiconductor chip 712 in this case respectively comprise an ultrasonic transducer element and are embedded in an encapsulation layer 706. The ultrasonic touch sensor 701 is connected to a covering 703 using an adhesive layer 704.

When ultrasound waves are emitted by an ultrasonic transducer element, reflections may occur at the housing 702 so that not only a variable echo signal 780 due to touching with the finger 705 but also possibly parasitic ultrasound signals 771, 772, 773, 774 are registered. These may interfere with the reliable registering of touching of the covering 703.

FIG. 8 illustrates a step for the production of a touch sensor. A prefabricated housing 801 having a recess 802 and having electrical terminals 811, 812 is provided.

As represented in FIG. 9, a first semiconductor chip 921 and a second semiconductor chip 922 may be arranged in the recess 802 of the prefabricated housing 801. Using bonding wires 931 and 932, electrical contacts of the first semiconductor chip 921 and of the second semiconductor chip 922 may be connected to the electrical terminals 811, 812. The first semiconductor chip 921 may comprise a first ultrasonic transducer element and the second semiconductor chip 922 may comprise a second ultrasonic transducer element.

Figure 11:
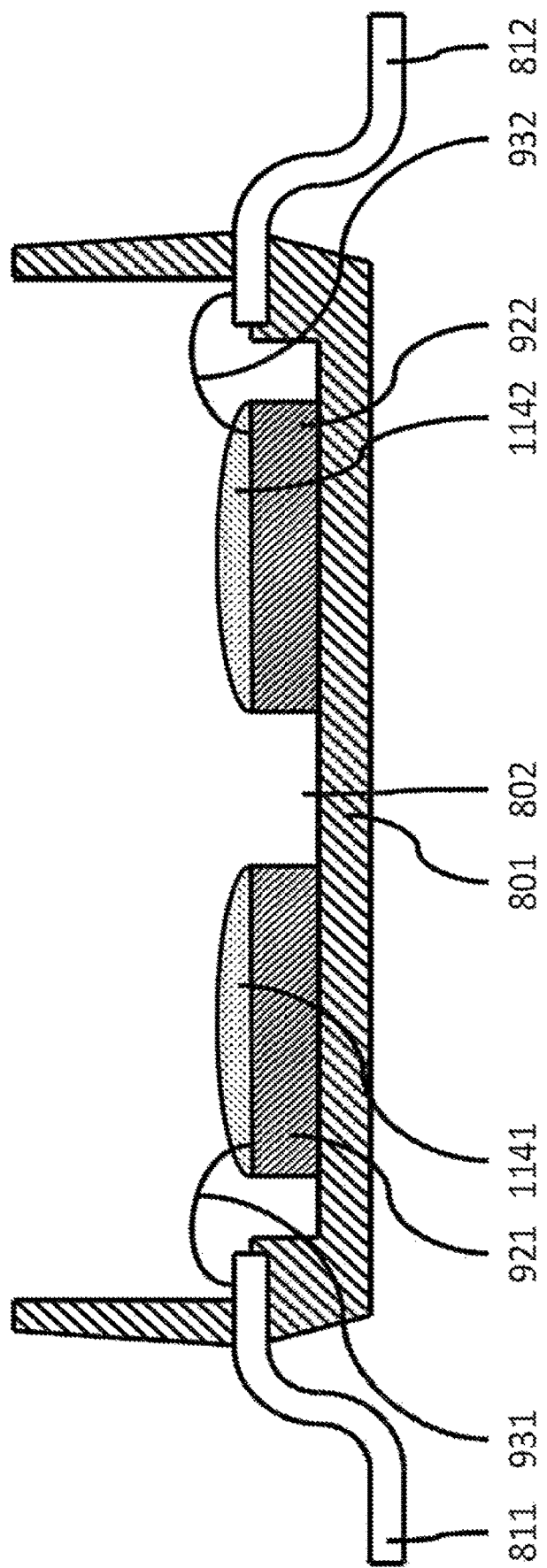
FIG. 11 shows a step for the production of an ultrasonic touch sensor.

The first ultrasonic transducer element and the second ultrasonic transducer element may respectively be covered with a gel 1041, 1042 for acoustic coupling to a potting compound. The applied gel 1041, 1042 may be subjected to a physical and/or chemical treatment so that a cured gel 1141, 1142 is obtained, as represented in FIG. 11 by darker hatching.

Figure 12:
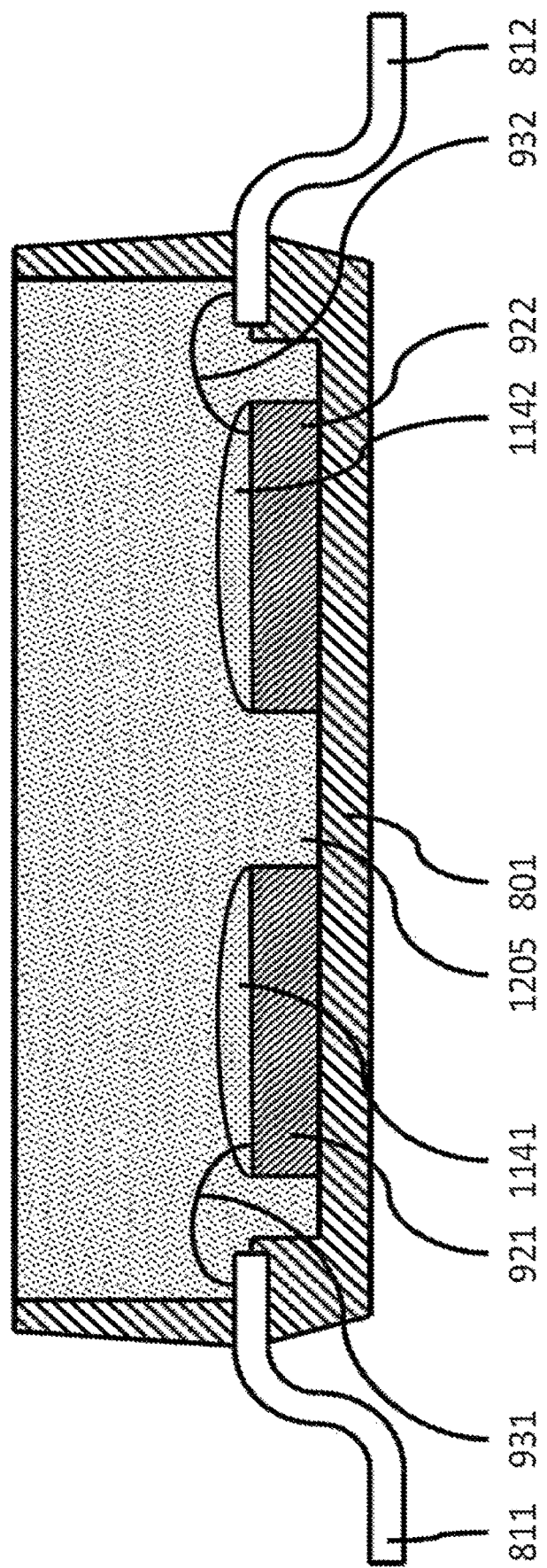
FIG. 12 shows a step for the production of an ultrasonic touch sensor.
Figure 13:
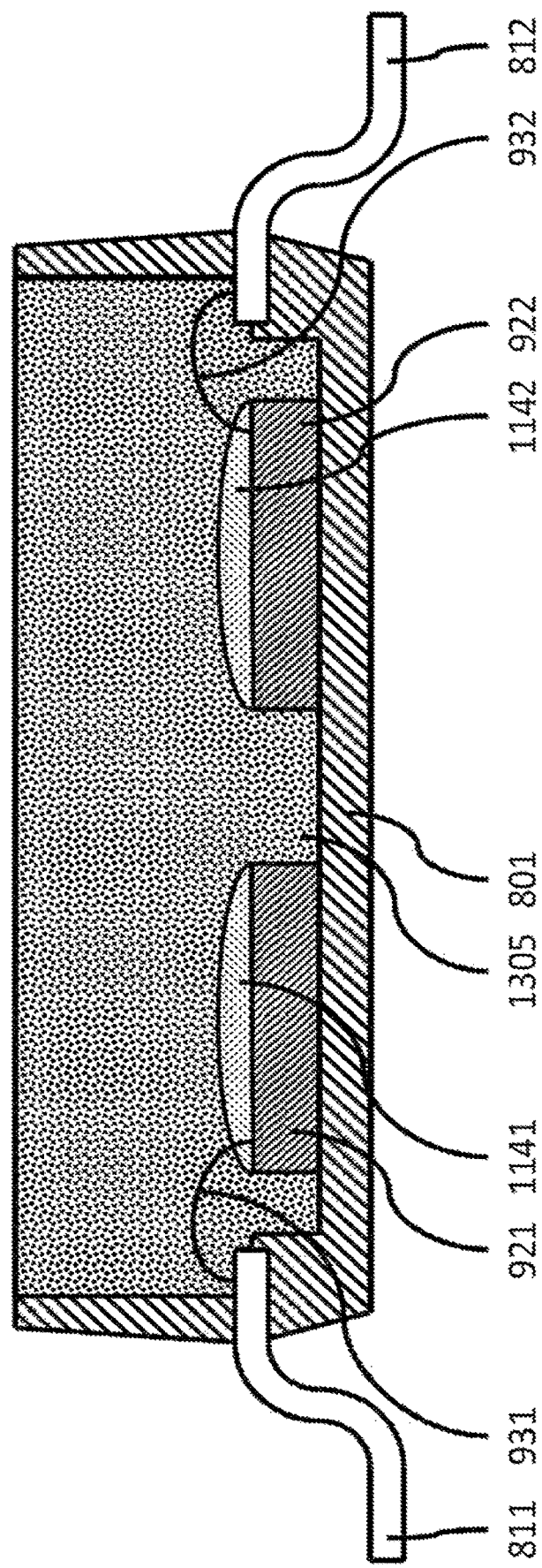
FIG. 13 shows a step for the production of an ultrasonic touch sensor.

Subsequently, the first semiconductor chip 921 and the second semiconductor chip 922 may be embedded in a potting compound 1205 (cf. FIG. 12), which may then be subjected to a physical and/or chemical treatment, in particular cured, as represented in FIG. 13 by the darker hatching.

The potting compound 1305 may in this case, in particular, protect the bonding wires 931, 932 and their fastening on the first semiconductor chip 921 or respectively the second semiconductor chip 922 and on the electrical terminals 811, 812 from mechanical stress. Via the free surface of the potting compound 1305, the ultrasonic transducer element may later be applied onto a covering.

Figure 14:
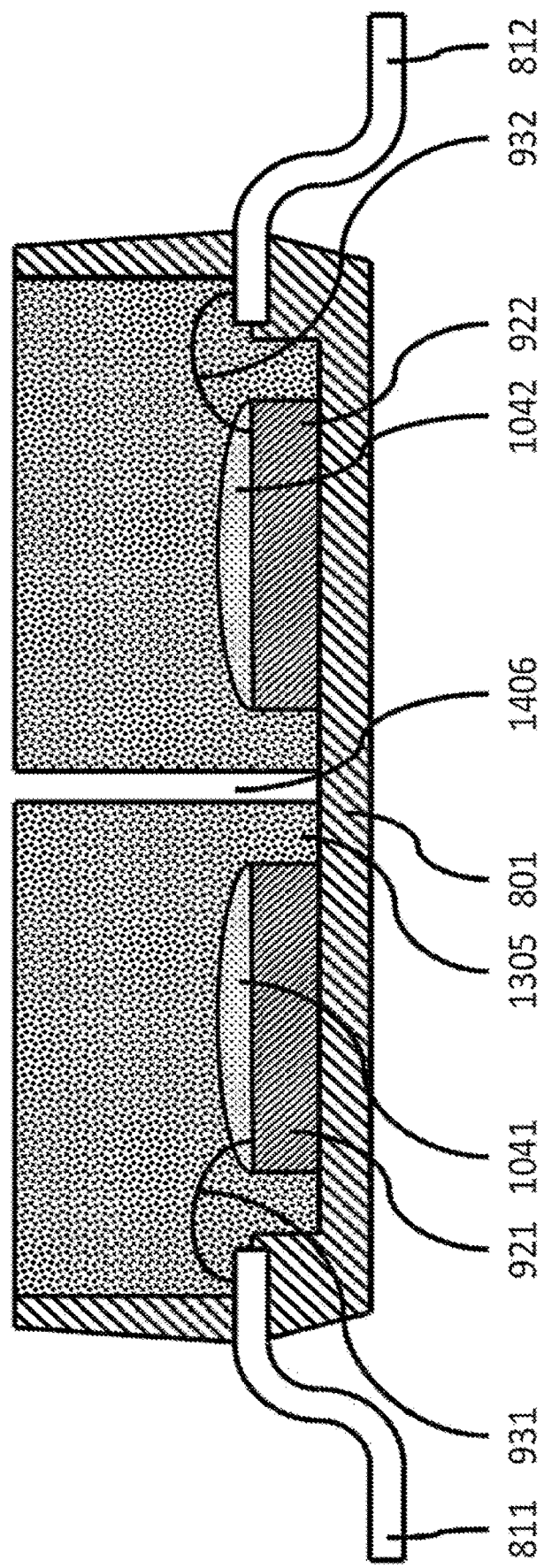
FIG. 14 shows a step for the production of an ultrasonic touch sensor.

As represented in FIG. 14, a recess 1406 is then introduced into the potting compound 1305 in order to produce an acoustic barrier between the first semiconductor chip and the second semiconductor chip. This may, for example, be carried out using laser ablation.

Figure 15:
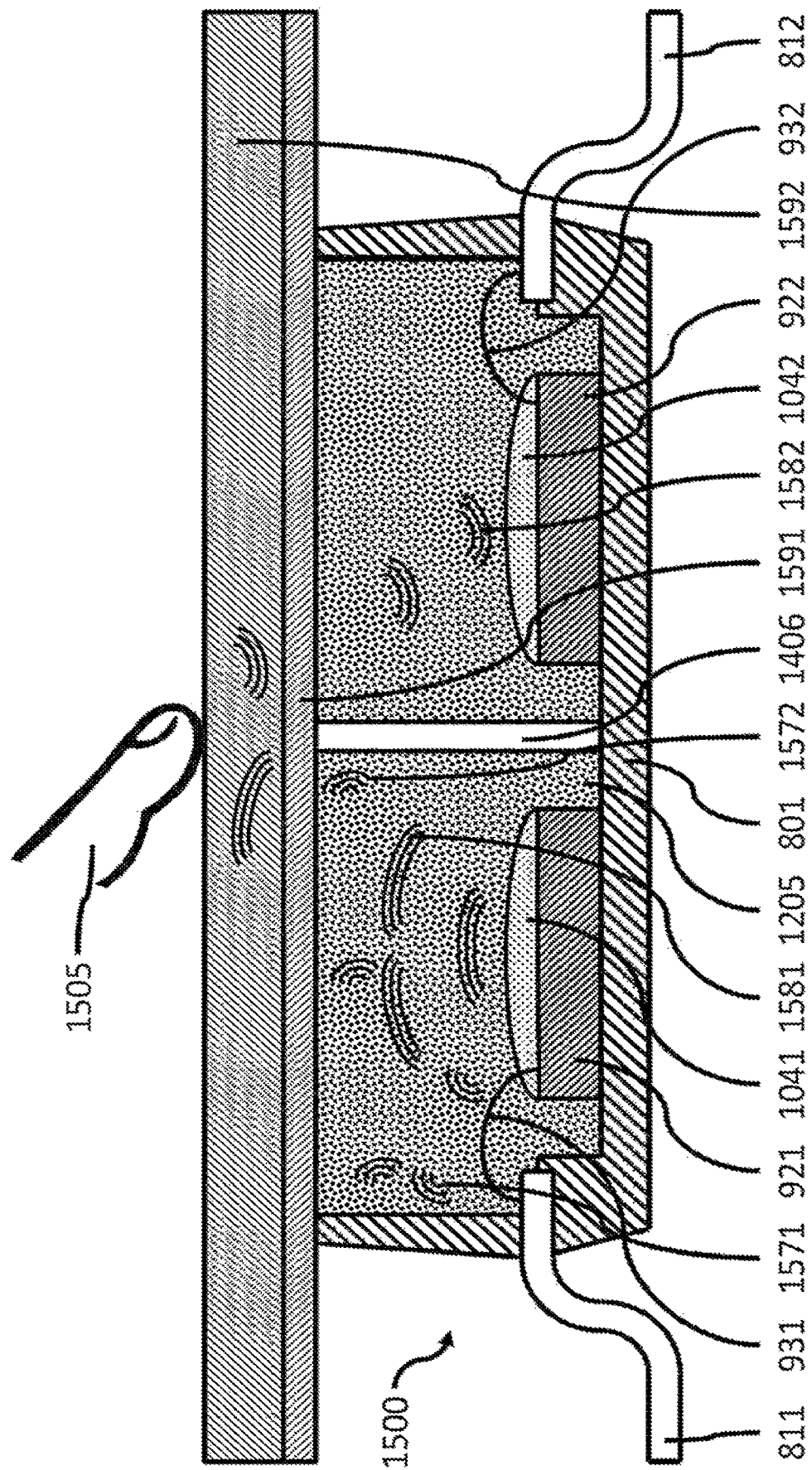
FIG. 15 shows an ultrasonic touch sensor.

FIG. 15 shows an ultrasonic touch sensor 1500 having a contact face for applying the ultrasonic touch sensor 1500 onto a covering 1592, having a first ultrasonic transducer element, having a first semiconductor chip 921, the first semiconductor chip 921 comprising the first ultrasonic transducer element, and having a second ultrasonic transducer element, wherein an acoustic barrier 1406 is formed between the first ultrasonic transducer element and the second ultrasonic transducer element. The second ultrasonic transducer element is in this case arranged laterally with respect to the first ultrasonic transducer element. In the ultrasonic touch sensor 1500 in FIG. 15, the acoustic barrier 1406 is formed as a cavity, in particular as an air gap. It is, however, also conceivable for the acoustic barrier to comprise an absorption material. In particular, polymers comprising tungsten may be used as an absorption material. It is likewise conceivable to provide the recess 1406 with a sound-absorbing wall structure in order to produce the acoustic barrier. In order to fasten the ultrasonic touch sensor 1500, the covering 1592 may comprise an adhesive layer 1591.

Using the acoustic barrier, it is possible to reduce the risk that parasitic ultrasound sources 1571, 1572, which are undesired but often difficult to avoid, and which occur during the emission of ultrasound waves 1581 by the first ultrasonic transducer element in the direction of the covering 1592, will reach the second ultrasonic transducer element. In particular, crosstalk may be avoided. The reliability of the detection of the touching of the covering 1592 with a finger 1505 may therefore be increased.

FIG. 16 represents a further ultrasonic touch sensor 1600. It corresponds substantially to the ultrasonic touch sensor 1500 which is represented in FIG. 15, so that for the description of the features provided with the reference numerals 1611, 1631, 1621, 1641, 1681, 1605, 1601, 1606, 1691, 1682, 1642, 1622, 1692, 1632, 1612, reference is made to the description of the corresponding features 811, 931, 921, 1141, 1581, 1305, 801, 1406, 1591, 1582, 1142, 922, 1592, 932, 812.

In addition to the first semiconductor chip 1621 and the second semiconductor chip 1622, the ultrasonic touch sensor 1600 also comprises a third semiconductor chip 1623. The third semiconductor chip 1623 may, in particular, comprise an integrated circuit for generating the control signals for a transmitting ultrasonic transducer element and/or for evaluating the reception signal for a receiving ultrasonic transducer element. The use of a third semiconductor chip 1623 may make it possible to manufacture the third semiconductor chip 1623 with process techniques that differ from the process techniques which are needed for the production of the ultrasonic transducer elements.

The third semiconductor chip 1623 may be provided as a semiconductor chip 1623 partially or fully embedded in the prefabricated housing. The third semiconductor chip 1623 may also be arranged laterally with respect to or even below the first semiconductor chip 1612.

A further ultrasonic touch sensor 1700 is depicted in FIG. 17. In contrast to the ultrasonic touch sensors 1500 and 1600, in the ultrasonic touch sensor 1700 a plurality of ultrasonic transducer elements are arranged in a single semiconductor chip 1721. A plurality of acoustic barriers 1761, 1762, 1763, 1764, 1765, 1766, 1767 are provided between the ultrasonic transducer elements. The acoustic barriers 1761, 1762, 1763, 1764, 1766, 1767 are formed as recesses which extend not only through the potting compound 1705 but also through the gel 1741 that covers the ultrasonic transducer elements. The plurality of ultrasonic transducer elements separated by the acoustic barriers 1761, 1762, 1763, 1764, 1766, 1767 can make it possible to determine not only touching, but also a position of the finger 1505. The ultrasonic touch sensor 1700 may consequently also be regarded as a position sensor.

FIG. 18 illustrates steps for the production of an ultrasonic touch sensor. In step 1801, a first semiconductor chip is provided, the first semiconductor chip comprising a first ultrasonic transducer element. In step 1802, a second ultrasonic transducer element is provided. In step 1803, the first semiconductor chip is embedded in a potting compound. In step 1804, a recess is introduced into the potting compound in order to produce an acoustic barrier between the first ultrasonic transducer element and the second ultrasonic transducer element.

ASPECTS

Some aspect implementations will be defined by the following aspects:

Aspect 1. An ultrasonic touch sensor (1500)
having a contact face for applying the ultrasonic touch sensor (1500) onto a covering (1592),
having a first ultrasonic transducer element,
having a first semiconductor chip (921), the first semiconductor chip (921) comprising the first ultrasonic transducer element,
having a second ultrasonic transducer element,
wherein an acoustic barrier is formed between the first ultrasonic transducer element and the second ultrasonic transducer element.

Aspect 2. The ultrasonic touch sensor (1500) as according to Aspect 1,
wherein the second ultrasonic transducer element is arranged laterally with respect to the first ultrasonic transducer element.

Aspect 3. The ultrasonic touch sensor (1500) as according to one of Aspects 1 or 2,
wherein the acoustic barrier is formed as a cavity, in particular as an air gap.

Aspect 4. The ultrasonic touch sensor (1700) as according to one of Aspects 1 to 3,
having a second semiconductor chip (922),
wherein the second semiconductor chip (922) comprises the second ultrasonic transducer element.

Aspect 5. The ultrasonic touch sensor (1500) as according to one of Aspects 1 to 3,
wherein the first semiconductor chip comprises the second ultrasonic transducer element.

Aspect 6. The ultrasonic touch sensor (1500) as according to one of the preceding aspects,
wherein the first ultrasonic transducer element and/or the second ultrasonic transducer element is covered with a gel for acoustic coupling to a potting compound.

Aspect 7. The ultrasonic touch sensor (1500) as according to one of the preceding aspects,
wherein the first semiconductor chip (921) and/or the second semiconductor chip (922) is embedded in a or the potting compound (1305).

Aspect 8. The ultrasonic touch sensor (1500) as according to Aspect 7,
wherein the barrier has an acoustic impedance which differs from the acoustic impedance of the potting compound.

Aspect 9. The ultrasonic touch sensor (1500) as according to one of Aspects 5 to 8,
wherein the first semiconductor chip comprises a multiplicity of ultrasonic transducer elements, which are separated from one another by acoustic barriers.

Aspect 10. The ultrasonic touch sensor (1500) as according to one of the preceding aspects,
wherein the ultrasonic touch sensor (1500) is a position sensor.

Aspect 11. A method for producing an ultrasonic touch sensor (1500), in particular an ultrasonic touch sensor (1500) as according to one of Aspects 1 to 10,
wherein a first semiconductor chip (921) is provided,
wherein the first semiconductor chip (921) comprises a first ultrasonic transducer element,
wherein a second ultrasonic transducer element is provided,
wherein the first semiconductor chip (921) is embedded in a potting compound (1205),
wherein a recess (1406) is introduced into the potting compound (1305), in particular using laser ablation, in order to produce an acoustic barrier between the first ultrasonic transducer element and the second ultrasonic transducer element.

Aspect 12. The method for producing an ultrasonic touch sensor (1500) as according to Aspect 11,
wherein a prefabricated housing (801) is provided,
wherein a first semiconductor chip (921) is arranged in a recess (802) of the prefabricated housing (801).

Aspect 13. The method for producing an ultrasonic touch sensor (1500) as according to one of Aspects 11 or 12,
wherein the first ultrasonic transducer element and/or the second ultrasonic transducer element is covered with a gel (1041) for acoustic coupling to the potting compound (1305).

Aspect 14. The method for producing an ultrasonic touch sensor (1500) as according to Aspect 13,
wherein the gel (1141) is cured.

Aspect 15. The method for producing an ultrasonic touch sensor (1500) as according to one of Aspects 11 to 14,
wherein the potting compound (1305) is cured.

Aspect 16. The method for producing an ultrasonic touch sensor (1500) as according to one of Aspects 11 to 15,
the recess (1406) is filled with an absorption material in order to produce the acoustic barrier.

Although specific aspect implementations have been illustrated and described in this description, persons with normal technical knowledge will realize that many alternative and/or equivalent implementations may be selected in place of the specific aspect implementations which are presented and described in the description, without departing from the scope of the implementation as presented. The intention is for this application to cover all adaptations or variations of the specific aspect implementations that are discussed herein. It is therefore intended for this implementation to be limited only by the claims and the equivalents of the claims.

The invention claimed is:

1. An ultrasonic touch sensor, comprising:
a housing;
a covering coupled to the housing, wherein an internal area is defined between the housing and the covering, and wherein the covering has a contact face configured to receive a touch;
a first ultrasonic transducer element arranged in the internal area and configured to transmit an ultrasonic transmit wave towards the covering, wherein a touch interface at the contact face of the covering is configured to reflect the ultrasonic transmit wave into the internal area as an ultrasonic reflected wave;
a first semiconductor chip comprising the first ultrasonic transducer element;
a second ultrasonic transducer element arranged in the internal area and configured to receive the ultrasonic reflected wave from the covering; and
an acoustic barrier formed between the first ultrasonic transducer element and the second ultrasonic transducer element, wherein the acoustic barrier is configured to reduce parasitic ultrasound waves originating from the ultrasonic transmit wave from reaching the second ultrasonic transducer element.

2. The ultrasonic touch sensor as claimed in claim 1, wherein the second ultrasonic transducer element is arranged laterally with respect to the first ultrasonic transducer element.

3. The ultrasonic touch sensor as claimed in claim 1, wherein the acoustic barrier is formed as a cavity comprising an air gap.

4. The ultrasonic touch sensor as claimed in claim 1, further comprising a second semiconductor chip,
wherein the second semiconductor chip comprises the second ultrasonic transducer element.

5. The ultrasonic touch sensor as claimed in claim 1, wherein the first semiconductor chip comprises the second ultrasonic transducer element.

6. The ultrasonic touch sensor as claimed in claim 1, further comprising:
a gel arranged on the first ultrasonic transducer element to cover the first ultrasonic transducer element; and
a potting compound that covers the first ultrasonic transducer element and the gel, wherein the potting compound extends from the gel to the covering,
wherein the gel is configured to acoustically couple the first ultrasonic transducer element to the potting compound.

7. The ultrasonic touch sensor as claimed in claim 6, wherein the first semiconductor chip is embedded in the potting compound.

8. The ultrasonic touch sensor as claimed in claim 7, wherein the acoustic barrier has an acoustic impedance which differs from an acoustic impedance of the potting compound.

9. The ultrasonic touch sensor as claimed in claim 5, further comprising:
a plurality of acoustic barriers,
wherein the first semiconductor chip comprises a plurality of ultrasonic transducer elements, including the first ultrasonic transducer element and the second ultrasonic transducer element, which are separated from one another by at least one of the plurality of acoustic barriers.

10. The ultrasonic touch sensor as claimed in claim 9, wherein each acoustic barrier of the plurality of acoustic barriers extends from a chip surface of the first semiconductor chip to the covering, and
wherein each acoustic barrier of the plurality of acoustic barriers is arranged laterally between two adjacent ultrasonic transducer elements of the plurality of ultrasonic transducer elements.

11. A method for manufacturing an ultrasonic touch sensor, the method comprising:
providing a covering coupled to a housing, wherein an internal area is defined between the housing and the covering, and wherein the covering has a contact face configured to receive a touch;
providing a first semiconductor chip having a first ultrasonic transducer element, wherein the first ultrasonic transducer element is arranged in the internal area such that the first ultrasonic transducer element is configured to transmit an ultrasonic transmit wave towards the covering,
wherein a touch interface at the contact face of the covering is configured to
reflect the ultrasonic transmit wave into the internal area as an ultrasonic reflected wave;
providing a second ultrasonic transducer element in the internal area such that the second ultrasonic transducer element is configured to receive the ultrasonic reflected wave from the covering;
embedding the first semiconductor chip in a potting compound; and
forming a recess in the potting compound using laser ablation in order to form an acoustic barrier between the first ultrasonic transducer element and the second ultrasonic transducer element,
wherein the acoustic barrier is configured to reduce parasitic ultrasound waves originating from the ultrasonic transmit wave from reaching the second ultrasonic transducer element.

12. The method for manufacturing the ultrasonic touch sensor as claimed in claim 11, the method further comprising:
covering at least one of the first ultrasonic transducer element or the second ultrasonic transducer element with a gel for acoustic coupling the at least one of the first ultrasonic transducer element or the second ultrasonic transducer element to the potting compound.

13. The method for manufacturing the ultrasonic touch sensor as claimed in claim 12, the method further comprising:
curing at least one of the gel or the potting compound.

14. The method for manufacturing the ultrasonic touch sensor as claimed in claim 11, the method further comprising:
filling the recess with an absorption material in order to form the acoustic barrier.

15. An ultrasonic touch sensor, comprising:
a housing;
a covering coupled to the housing, wherein an internal area is defined between the housing and the covering, and wherein the covering has a contact face configured to receive a touch and an internal interface that faces the internal area;
a first ultrasonic transducer element arranged in the internal area;
a first potting compound arranged in the internal area and in contact with the internal interface of the covering, wherein the first potting compound extends between the first ultrasonic transducer element and the internal interface;
a first semiconductor chip arranged in the internal area and comprising the first ultrasonic transducer element;
a second ultrasonic transducer element arranged in the internal area;
a second potting compound arranged in the internal area and in contact with the internal interface of the covering, wherein the second potting compound extends between the second ultrasonic transducer element and the internal interface; and
an acoustic barrier formed laterally between the first ultrasonic transducer element and the second ultrasonic transducer element, wherein the acoustic barrier is formed laterally between the first potting compound and the second potting compound.

16. The ultrasonic touch sensor as claimed in claim 15, further comprising:
   a first gel arranged on the first ultrasonic transducer element to cover the first ultrasonic transducer element; and
   a second gel arranged on the second ultrasonic transducer element to cover the second ultrasonic transducer element,
   wherein the first potting compound encapsulates the first ultrasonic transducer element and the first gel, and the first potting compound extends from the first gel to the internal interface,
   wherein the first gel is configured to acoustically couple the first ultrasonic transducer element to the first potting compound,
   wherein the second potting compound encapsulates the second ultrasonic transducer element and the second gel, and the second potting compound extends from the second gel to the internal interface, and
   wherein the second gel is configured to acoustically couple the second ultrasonic transducer element to the second potting compound.

17. The ultrasonic touch sensor as claimed in claim 16, further comprising:
   an electrical terminal that extends through the housing into the internal area; and
   a bonding wire coupled to the first semiconductor chip and the electrical terminal,
   wherein the first potting compound is arranged on the electrical terminal within the internal area and encapsulates the bonding wire.

18. The ultrasonic touch sensor as claimed in claim 15, further comprising:
   a first gel arranged on the first ultrasonic transducer element to cover the first ultrasonic transducer element; and
   a second gel arranged on the second ultrasonic transducer element to cover the second ultrasonic transducer element,
   wherein the first potting compound covers the first ultrasonic transducer element and the first gel, and the first potting compound extends from the first gel to the internal interface,
   wherein the first gel is configured to acoustically couple the first ultrasonic transducer element to the first potting compound,
   wherein the second potting compound covers the second ultrasonic transducer element and the second gel, and the second potting compound extends from the second gel to the internal interface, and
   wherein the second gel is configured to acoustically couple the second ultrasonic transducer element to the second potting compound.

19. The ultrasonic touch sensor as claimed in claim 18, wherein the acoustic barrier laterally separates the first potting compound and the second potting compound, and
   wherein the acoustic barrier has an acoustic impedance which differs from an acoustic impedance of the first potting compound and an acoustic impedance of the second potting compound.

20. The ultrasonic touch sensor as claimed in claim 15, wherein the acoustic barrier is formed as a cavity comprising an air gap that laterally separates the first potting compound and the second potting compound.

* * * * *